(12) United States Patent
Chambliss et al.

(10) Patent No.: US 7,539,754 B2
(45) Date of Patent: May 26, 2009

(54) SYSTEM FOR ALLOCATING STORAGE PERFORMANCE RESOURCE

(75) Inventors: David D. Chambliss, Morgan Hill, CA (US); Divyesh Jadav, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/867,031

(22) Filed: Oct. 4, 2007

(65) Prior Publication Data

US 2008/0021996 A1    Jan. 24, 2008

Related U.S. Application Data

(63) Continuation of application No. 10/309,606, filed on Dec. 4, 2002, now Pat. No. 7,334,032.

(51) Int. Cl.
    *G06F 15/16*    (2006.01)
    *G06F 15/173*    (2006.01)

(52) U.S. Cl. .................. 709/224; 709/225; 709/226; 709/213; 709/216; 711/170; 711/133; 711/118; 711/100

(58) Field of Classification Search .............. 709/224, 709/203, 226, 225
See application file for complete search history.

(56) References Cited

U.S. PATENT DOCUMENTS

| | | | |
|---|---|---|---|
| 5,283,897 A | 2/1994 | Georgiadis et al. |
| 5,440,697 A | 8/1995 | Boegel et al. |
| 5,537,542 A | 7/1996 | Eilert et al. |
| 5,787,153 A | 7/1998 | Bankay et al. |
| 5,848,270 A | 12/1998 | DeLuca et al. |
| 5,867,706 A | 2/1999 | Martin et al. |
| 6,253,079 B1 | 6/2001 | Valentine et al. |
| 6,601,020 B1 | 7/2003 | Myers |
| 6,775,644 B2 | 8/2004 | Myers |
| 6,832,253 B1 | 12/2004 | Auerbach |

(Continued)

OTHER PUBLICATIONS

Pentakalos, et al., "Analytical Performance Modeling of Hierarchial Mass Storage Systems," Computers, IEEE Transactions, IEEE Xplore, vol. 46, Issue 10, Oct. 1997, pp. 1103-1118.
Pentakalos, et al, "An Approximate Performance Model of A Unitree Mass Storage System," Mass Storage Systems, IEEE Xplore, Sep. 1995, pp. 210-224.

*Primary Examiner*—Tonia L Dollinger
*Assistant Examiner*—Jude J Jean Gilles
(74) *Attorney, Agent, or Firm*—Gibb I.P. Law Firm, LLC

(57) ABSTRACT

A method and structure for a multi-workload storage system is disclosed that is adapted to determine if an additional workload can be placed on the storage system. The invention has storage elements and a proxy load generator connected to the storage elements. The proxy load generator is adapted to create a proxy workload based on an additional workload from a potential client. The proxy workload has a reduced duty cycle when compared to a duty cycle of said additional workload. A control server is connected to the storage elements and the proxy load generator. The control server applies the proxy workload to the storage elements during discontinuous time slices.

21 Claims, 2 Drawing Sheets

U.S. PATENT DOCUMENTS

| | | | |
|---|---|---|---|
| 6,848,079 B2 * | 1/2005 | Ito | 715/249 |
| 6,986,139 B1 * | 1/2006 | Kubo | 718/105 |
| 7,159,013 B2 | 1/2007 | Cudd et al. | |
| 2002/0046316 A1 | 4/2002 | Borowsky et al. | |
| 2002/0077791 A1 | 6/2002 | Go et al. | |
| 2002/0091722 A1 | 7/2002 | Gupta et al. | |

* cited by examiner

SYSTEM FOR ALLOCATING STORAGE PERFORMANCE RESOURCE

CROSS-REFERENCE TO RELATED APPLICATIONS

This application is a continuation of U.S. application Ser. No. 10/309,606 filed Dec. 4, 2002, now U.S. Pat. No. 7,334,032 the complete disclosure of which, in its entirety, is herein incorporated by reference.

BACKGROUND OF THE INVENTION

1. Field of the Invention

The present invention generally relates to storage systems that service multiple workloads, each with potentially different quality of service (QOS) requirements, and more particularly to an improved system for determining whether new workloads can be added to an existing system.

2. Description of the Related Art

In storage systems that service multiple workloads, the multiple workloads may originate from different sources including different applications, different departments of a company, or from totally independent customers, as in the case of a Storage Service Provider (SSP). One issue in shared storage systems that provide service guarantees to existing workloads is how to determine whether a new workload that wants to be serviced by the storage system should be accepted for service or not.

The degree to which a shared storage system meets QOS requirements is usually evaluated using a contractual agreement called a Service Level Agreement (SLA). The SLA spells out the performance Service Level Guarantees (SLGs) that must be satisfied by the system. An example of a SLG is that p percent of the time over some interval (example, 1 day) the operator of the storage system will guarantee that if the offered load is under x megabytes per second or y I/Os per second, then the delivered response time will be less than z milliseconds. If the operator reneges on this promise, then a financial penalty is incurred. In such a scenario, the operator needs a foolproof way to, given an installed storage system, determine with a high degree of certainty whether such an agreement can be signed for a new customer's workload without incurring a net loss as a result of servicing the new customer and ensure that the system has enough reserve storage performance resource such that existing workloads will not suffer to the extent that a penalty will result when the new workload is accepted for servicing. The proposed invention solves both these issues. In addition, the invention can be used to evaluate the value of migrating existing data on the shared storage system, so as to better utilize the storage resources.

SUMMARY OF THE INVENTION

The invention provides a multi-workload storage system adapted to service input/output requests. The storage system includes storage elements and a proxy load generator connected to the storage elements. The proxy load generator creates a proxy workload based on an additional workload from a potential client. The proxy workload has a reduced duty cycle when compared to a duty cycle of the additional workload. A control server is connected to the storage elements and the proxy load generator. The control server applies the proxy workload to the storage elements during discontinuous time slices.

The reduced duty cycle is greater than a minimum monitoring time interval and is less than a measurement time interval at which existing clients of the storage system are permitted to evaluate a quality of service measure of the storage system. The reduced duty cycle and the discontinuous time slices are selected to avoid degrading a quality of service measure of the storage system below a level promised to existing clients of the storage system. The additional workload is based on an estimated nature of input/output requests expected from the potential client. In the invention, monitors connect clients to the storage elements. The control server evaluates an impact of the proxy workload on the storage system over an evaluation period using the monitors.

The invention also discloses a method for managing a workload in a computer storage system. First, the invention analyzes a candidate client to determine an input/output workload the client is expected to generate. The invention determines an approximate workload based on an analysis of the input/output workload. The invention generates a proxy workload from the approximate workload. The proxy workload consumes a lower average performance resource of the storage system than the approximate workload and has a reduced duty cycle when compared to a duty cycle of the additional workload. The invention applies the proxy workload to the storage system during discontinuous time slices. The reduced duty cycle is greater than a minimum monitoring time interval and is less than a measurement time interval at which existing clients of the storage method are permitted to evaluate a quality of service measure of the storage system. The reduced duty cycle and the discontinuous time slices are selected to avoid degrading a quality of service measure of the storage system below a level promised to existing clients of the storage system. The additional workload approximates a demand the input/output workload would place on the storage system. The invention evaluates an impact of the proxy workload on the storage system over an evaluation period.

BRIEF DESCRIPTION OF THE DRAWINGS

The invention will be better understood from the following detailed description of preferred embodiments of the invention with reference to the drawings, in which.

DETAILED DESCRIPTION OF PREFERRED EMBODIMENTS OF THE INVENTION

The invention determines whether a shared storage system already installed is able to handle additional load arising either from new uses of the system or from projected growth. The system is able to evaluate the remaining performance capacity in a system that is handling a steady state set of workloads. This evaluation is used to determine where the new load needs to be placed, and whether existing storage resources are sufficient to service the new workload or if new storage facilities need to be purchased/provisioned. The evaluation of performance capacity includes the determination of whether the required throughput can be achieved, for the load to be installed, and also whether the addition of this load will cause the performance of workloads already being serviced to be degraded unacceptably.

The simplest way to determine whether a candidate workload can be satisfied by an installed system in steady state is to offer the workload to the system (without signing any performance guarantee) and instrument the delivered performance. With knowledge of required performance targets, a yes/no decision can then be made about the feasibility of signing a contract for the candidate workload. If the performance targets are not met, additional storage resources can be provisioned, and the procedure can be iterated till satisfied. However, by using this technique, existing workloads may be degraded unacceptably.

With the invention, actual workloads are injected into the system to perform the feasibility evaluation for the candidate workload. However, the invention injects the workloads in a non-intrusive way (described below) that does not significantly adversely affect performance commitments made to existing workloads. Accordingly, the penalty impact due to the feasibility evaluation is minimized on the storage system operator.

Figure 1:
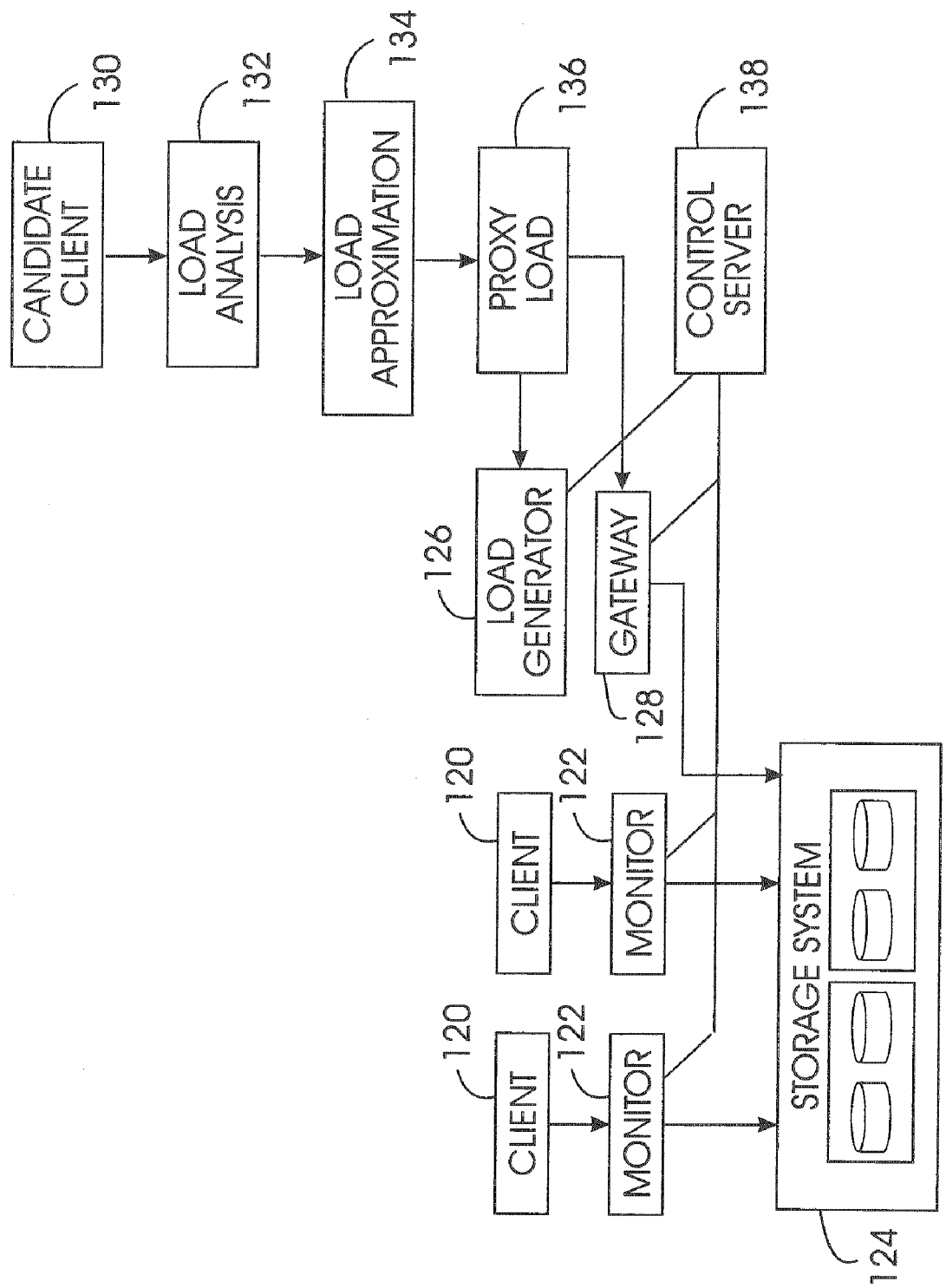
FIG. 1 is a schematic diagram of a system according to the invention.

FIG. 1 shows a storage system 124 capable of servicing input/output requests from clients 120, each of which is provided access to a system monitor 122. At any given time, a fixed number of these clients 120 generate requests to the system 124, while one candidate client 130 wants to be serviced by the system. The monitors 122 measure the quantity of load and response time metrics for the servicing of load for clients 120. One embodiment of such a monitor 122 is a gateway device 128 that provides external users access to the system. A control server 138 coordinates and directs the monitors 122. A load generator 126 submits input/output requests to the system 124 also under control of the control server 138. A load analysis unit 132, under control of the control server 138, performs a procedure for analyzing the candidate client 130 to determine the essential I/O workload the client 130 is expected to generate, thereby generating an approximate workload 134 (load approximation) resembling the workload that the client will generate. Alternatively, if the client is an existing workload, the invention can skip the processing performed in the load analysis unit 132 and simply use the actual existing workload to form a proxy load 136 using the proxy load generator 126.

The proxy workload 136 is similar to the approximate workload (or existing workload) 134, but consumes a lower average performance resource of the storage system. The proxy workload 136 has a duty cycle that is substantially less than the approximate workload (or the existing workload, if one is available) 134. Also, the proxy workload 136 is injected over short time interval slices (example: 200 to 2000 milliseconds) with a low duty cycle (example: once every 10 minutes). For example, the duty cycle of the approximate workload (or existing workload) 134 could be constant or be a large percentage (e.g., hours) of a given time period (e.g., day). To the contrary, the duty cycle of the proxy workload 136 is a substantially smaller percentage (e.g., seconds, milliseconds, etc.) of the same time period (e.g., day). The duty cycle of the proxy workload 136 is reduced when compared to the full duty cycle of the approximate workload (or existing workload) 134 to allow the storage system 124 to be tested, yet to prevent the storage system 124 from suffering performance degradation for any extended period of time. The duty cycle is selected to be at least as long as the minimum performance measurement time period as limited by the capabilities of the monitors 122, yet less than the approximate workload 134 duty cycle (although, the duty cycle is usually much closer to the minimum performance measurement time period). This allows the effect of the proxy load on the storage system 124 to be measured, yet avoids prolonged performance penalties.

Thus, the invention tests the proxy workload 136 using the actual storage system 124, (through the operation of the control server 138) as opposed to using a simulation model of the storage system. This allows the invention to be more accurate than a simulation based approach. Further, the invention allows the storage system to suffer from performance degradation; however, it does so for such short periods of time (e.g., milliseconds) and so infrequently (e.g., 6 times an hour) that the "average" system performance over the time period required by the SLA, (e.g., one day) is not affected. This not only allows the invention to test the proposed additional workload using the actual operating storage system 124, but also allows the storage system to maintain the quality of service promised in the SLA to the existing customers.

Figure 2:
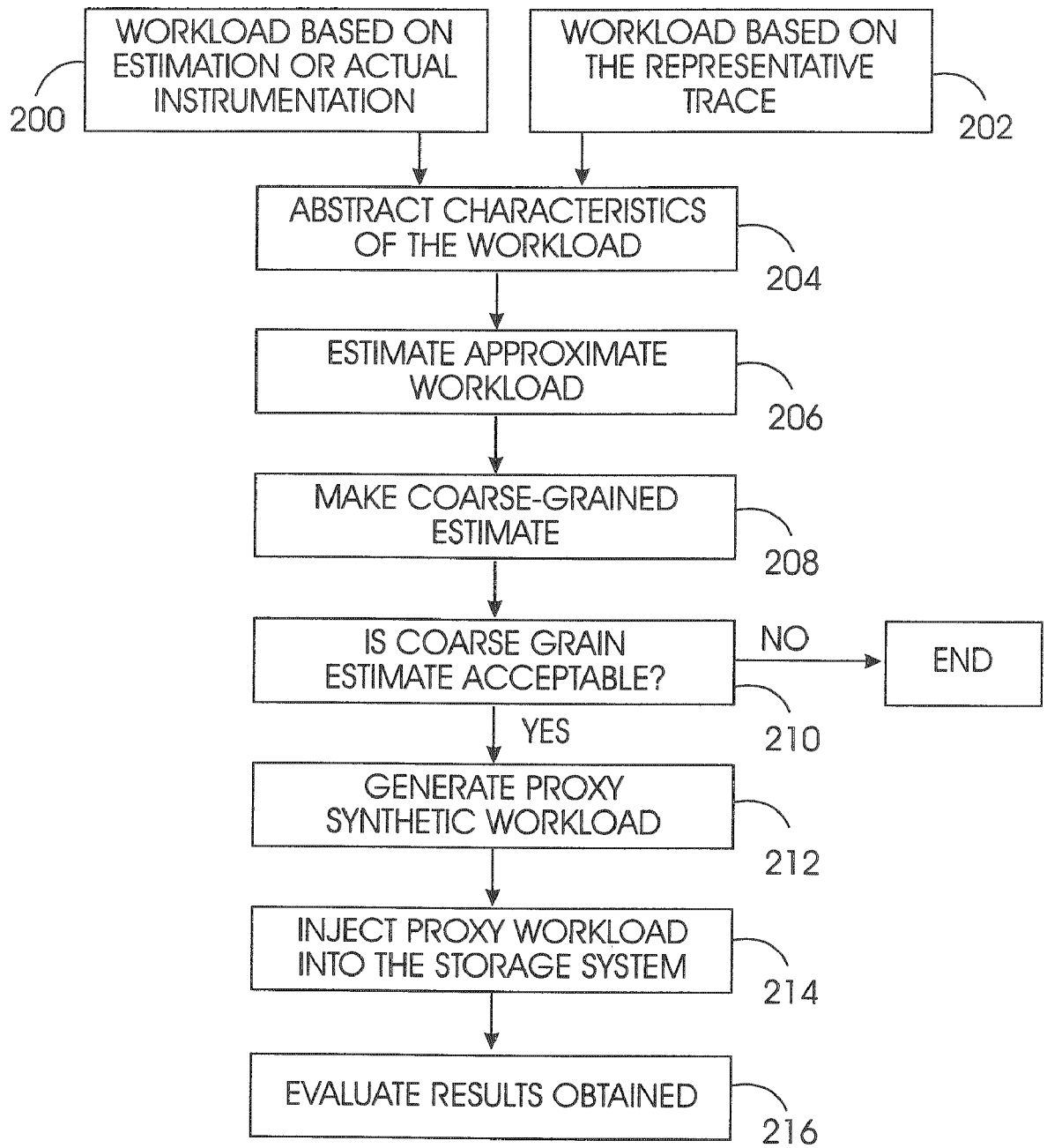
FIG. 2 is a flow diagram illustrating a preferred method of the invention.

The procedure of evaluation for the candidate workload is shown in FIG. 2. The candidate workload is first received for evaluation in one of two forms. Either the attributes of the workload that are needed by the decision process of the invention are provided by the generator of the workload 200, based on estimation or actual instrumentation, or a representative trace of the workload is provided 202. In either case, the workload is analyzed as described below.

The essential I/O characteristics of the workload are abstracted 204 by the load analysis unit 132. These characteristics include mean values of I/O rate, I/O size distribution, distribution of read and write I/Os, sequentiality and locality. The time structure of the workload is characterized by the degree of burstiness (e.g., number of I/O bursts per given period of time).

Based on this analysis 204, the approximate workload is estimated 206 by analyzing the distribution of load intensity over short intervals (example, 50 milliseconds). Using these characteristics, the approximate workload is constructed. The method of construction is to sum the set of workload basis vectors or essential components, each of which is the product of a stationary pattern with mean characteristics with a pattern with intensity fluctuations.

Based on the analyzed workload, a coarse-grained estimate 208 is made of the effect of the candidate workload on the steady state system. The coarse grained estimate is extrapolated from an instrumentation of the storage system 124, in terms of the basis vectors, in the absence of any contracted workload. Such an instrumentation reveals an approximate available storage performance reserve at a given load intensity operating point.

This mechanism allows the user to quickly accept some candidate workloads immediately (because the system has adequate storage performance reserve to accept the candidate loads and continue meeting the service levels of existing workloads), and also quickly reject some candidate workloads (because they are seen to have excessively bad performance effects on the overall system i.e., they push the steady state operating point to an unacceptable region of system performance).

Thus, the invention will reject the approximate workload 134 if it requires more resources than the storage system can ever supply (e.g., if the approximate workload requires more bytes per second of storage performance than the system has in total). In addition, the coarse-grained estimate can be refined to compare the approximate workload storage performance requirements to a percentage (e.g., 50%, 100%, 150%, etc.) of remaining storage performance resource once existing usage is considered. The percentage selected will depend upon the nature of the storage system and its usage.

This coarse-grained estimate prevents approximate workloads that could never realistically be serviced by the system from being tested in the system (thereby decreasing testing time and reducing the demands made upon the storage system). If the approximate workload is found unacceptable in the coarse-grained estimate 210, the approximate workload 134 is rejected. For the remaining cases, evaluation proceeds with item 212.

The proxy synthetic workload 136 is generated from the approximate synthetic workload in item 212. As explained above, the proxy workload 136 is similar to the approximate load, except that it is designed to have a reduced average impact on the storage system 124, with the goal of minimizing the QOS degradation to existing clients 120. Recall that the QOS commitment to clients 120 is of the form that over a reasonably long interval of time (example 1 day) that consists of several smaller sub-intervals (example, of duration 1 second), the delivered response time for well-behaved demanded load will be lower than an agreed upon value, an agreed percentage of the time (example 95%). The proxy workload 136 is designed to exploit this general form of QOS commitment. As discussed above, the proxy workload 136 is injected over short time interval slices (example: 200 to 2000 milliseconds) with a low duty cycle (example: once every 10 minutes).

This time-sliced injection with low duty cycle has the advantage of combining execution of a candidate load-like workload on the live, steady-state storage system 124 with minimal effect on QOS seen by the steady state workloads. An additional benefit of the low duty cycle is that the feasibility evaluation of the candidate workload is spread out over a longer time interval than if it were done by actually injecting the candidate load. This results in evaluation over a broader range of operating conditions due to previously contracted workloads, which is preferable.

By the same yardstick, one issue with the time sliced injection approach as described up to this point is that the effects of the actual candidate load on the cache resource of the storage system 124 are limited. This results in a less accurate estimate of the effect of the load on the storage performance reserve, than can be obtained by continuously injecting the candidate load. This issue is addressed by biasing the proxy load to compensate for the cache resource consumption. One mechanism for this is to add sequential bursts to the proxy load to probe the effects of cache contamination on existing loads.

Thus, the invention designs the proxy workload 136 to truly mimic the effects the approximate workload 134 (or existing workload) would place on the system if it were operating at the approximate workload's full duty cycle. As mentioned above, the proxy workload 136 simulates the I/O demand of the approximate workload 134. In addition, the proxy workload 136 could briefly include an excessive I/O demand burst that greatly exceeds the I/O demand that the approximate workload 134 would actually exhibit. This excessive I/O demand is used to more realistically apply the true nature of the full duty cycle of the approximate workload 134 on the system considering that the proxy workload 136 has such a short duty cycle. In order to do this, the excessive I/O demand is briefly applied in order to contaminate the cache (as the full duty cycle of the approximate or existing workload may do). Immediately after such saturation, the proxy workload 136 applies an I/O demand that closely matches that of the approximate workload 134. This allows the storage system's 124 performance with the additional proxy workload 136 to be measured during the time that the cache is decaying from the contamination and is reaching equilibrium, which would more accurately demonstrate the storage system's 124 performance during the longer full duty cycle of the approximate workload 134. Therefore, by altering the I/O demand of the proxy workload 136, the invention compensates for the reduced duty cycle of the proxy workload 136 and more accurately demonstrates the effect the approximate workload 134 will have on the storage system's 124 performance.

The proxy workload 136 is injected into the storage system 124 over an evaluation period. The load injection is synchronized with the monitors 122 in the system so that the effect of injecting the workload are instrumented in a time resolved manner. The monitors 122 aggregate the service statistics and cache hit ratios. The results obtained from the monitors 122 are evaluated by the control server. An estimate is made of the effect of admitting the candidate workload on the storage system 124. The number of, and degree of impact on, existing loads in terms of the QOS are the main criteria in arriving at this estimate. Variance and confidence level values of the estimate are also computed. If necessary, the parameters of the proxy workload 136 are changed and the foregoing steps are repeated. An admission decision is made about the candidate, and implemented. If the candidate load is admitted, then the monitors 122 gather the statistics as a result of actually servicing the candidate load, over a period of time. These statistics are fed back to the analyzer and proxy load generator, to improve the accuracy of future candidate loads.

Most approaches to admission control rely on extrapolation of admitting a candidate from a known operating state, or simulation of the effect of admitting a candidate. To the contrary, the invention exercises the target system with a variant of the candidate, rather than using simulation or extrapolation. The invention is targeted towards a general purpose storage system. The invention does not use a simulation model to perform admission control (it actually injects a candidate workload-like load to do so) and is not restricted to constant bit rate multimedia streams and thus, applies to a general purpose storage system. The invention is not restricted to a media-on-demand system, and does not require file lengths for performing admission control.

With the invention, actual workloads are injected into the system to perform the feasibility evaluation for the candidate workload. However, the invention injects the workloads in a non-intrusive way (time slices, reduced cycle, etc.) that does not significantly adversely affect performance commitments made to existing workloads. Accordingly, the penalty impact due to the feasibility evaluation is minimized on the storage system operator.

This time-sliced injection with low duty cycle has the advantage of combining execution of a candidate load-like workload on the live, steady-state storage system 124 with minimal effect on QOS seen by the steady state workloads. An additional benefit of the low duty cycle is that the feasibility evaluation of the candidate workload is spread out over a longer time interval than if it were done by actually injecting the full candidate load. This results in evaluation over a broader range of operating conditions due to previously contracted workloads, which is preferable.

The invention makes a yes/no decision about whether or not an additional workload can be safely accepted by an installed storage system that is subject to QOS constraints. A benefit of the invention is that a negative answer to this decision problem can be used as input to a provisioning process that recommends addition of hardware resources (Example: hard disks). Other benefits of the invention are that the invention can be used to evaluate the choice of different data placement policies for the additional workload. The invention can be used with a data placement policy as recommended by a placement tool or a storage administrator for the data set of the additional workload. The invention can be used to determine whether the workload can be accepted or not. In addition, the proxy evaluation can be repeated using different data placement policies and the answers returned by each can be compared and contrasted. The percentage of storage performance resource that remains after allocating the additional workload for each data placement policy can be used to decide which is the best data placement policy for the additional workload (i.e., which consumes the least amount of storage performance resource). The invention can also be used to evaluate the value of migrating the data of an existing workload from one set of storage devices to another. This can be done by creating a migrated copy of the existing workload's data and applying the invention to the existing workload, as if it were an additional workload. The result of applying the invention can be used to determine the utility of performing such data migration.

The invention determines whether a shared storage system already installed is able to handle additional load arising either from new uses of the system or from projected growth. The system is able to evaluate the remaining performance capacity in a system that is handling a steady state set of workloads. This evaluation is used to determine where the new load needs to be placed, and whether existing storage resources are sufficient to service the new workload or if new storage facilities need to be purchased/provisioned. The evaluation of performance capacity includes the determination of whether the required throughput can be achieved, for the load to be installed, and also whether the addition of this load will cause the performance of workloads already being serviced to be degraded unacceptably.

While the invention has been described in terms of preferred embodiments, those skilled in the art will recognize that the invention can be practiced with modification within the spirit and scope of the appended claims.

What is claimed is:

1. A multi-workload storage system adapted to service input/output requests, said storage system comprising:
   storage elements;
   a proxy workload generator connected to said storage elements, wherein said proxy workload generator is adapted to generate a proxy workload based on an approximated additional workload from a potential client, said proxy workload having a reduced duty cycle when compared to a full duty cycle of said additional workload;
   a control server connected to said storage elements and said proxy workload generator, said control server being adapted to apply said proxy workload to said storage elements during discontinuous time slices; and
   monitors connected to said storage elements and said control server, said monitors being adapted to measure a performance of said storage system as said proxy workload is applied, wherein said control server is further adapted to estimate an impact of said additional workload on said storage system based on said performance.

2. The system in claim 1, wherein said discontinuous time slices are greater than a minimum monitoring time interval of said monitors.

3. The system in claim 1, wherein said discontinuous time slices are less than a measurement time interval at which existing clients of said storage system are permitted to evaluate a quality of service measure of said storage system.

4. The system in claim 1, wherein said reduced duty cycle and said discontinuous time slices are selected to avoid degrading a quality of service measure of said storage system below a level promised to existing clients of said storage system.

5. The system in claim 1, wherein said additional workload is based on an estimated nature of input/output requests expected from said potential client.

6. A multi-workload storage system adapted to service input/output requests, said storage system comprising:
   a workload analysis unit adapted to approximate an additional workload from a potential client;
   storage elements;
   a proxy workload generator connected to said storage elements and said workload analysis unit, wherein said proxy workload generator is adapted to generate a proxy workload based on said additional workload, said proxy workload having a reduced duty cycle when compared to a full duty cycle of said additional workload;
   a control server connected to said storage elements and said proxy workload generator, wherein said control server is adapted to apply said proxy workload to said storage elements during discontinuous time slices; and,
   monitors connected to said storage elements and said control server, said monitors being adapted to measure a performance of said storage system as said proxy workload is applied;
   wherein said control server is further adapted to estimate an impact of said proxy workload on said storage system based on said performance.

7. The system in claim 6, wherein said discontinuous time slices are greater than a minimum monitoring time interval of said monitors.

8. The system in claim 6, wherein said discontinuous time slices are less than a measurement time interval at which existing clients of said storage system are permitted to evaluate a quality of service measure of said storage system.

9. The system in claim 6, wherein said additional workload is based on an estimated nature of input/output requests expected from said potential client.

10. A method for managing a multi-workload storage system, said method comprising:
    analyzing a candidate client to determine an input/output workload that said candidate client is expected to generate in order to produce an approximated additional workload from said candidate client;
    generating a proxy workload from said additional workload, wherein said proxy workload is designed to consume a lower average performance resource of said storage system than said additional workload and has a reduced duty cycle when compared to a full duty cycle of said additional workload;
    applying said proxy workload to said storage system during discontinuous time slices;
    measuring a performance of said storage system, during said applying of said proxy workload; and
    estimating an impact of said additional workload on said storage system based on said performance.

11. The method in claim 10, wherein said discontinuous time slices are each greater than a minimum monitoring time interval.

12. The method in claim 10, wherein said reduced duty cycle and said discontinuous time slices are selected to avoid degrading a quality of service measure of said storage system below a level promised to existing clients of said storage system.

13. The method in claim 10, wherein said approximated additional workload approximates a demand said input/output workload would place on said storage system.

14. A method for managing a multi-workload storage system, said method comprising:

generating a proxy workload based on an approximated additional workload from a candidate client, wherein said proxy workload has a reduced duty cycle when compared to a full duty cycle of said additional workload;

applying said proxy workload to said storage system during discontinuous time slices, wherein said discontinuous time slices are shorter than time periods said additional workload would be applied to said storage system;

measuring a performance of said storage system during said applying of said proxy workload; and estimating an impact of said additional workload on said storage system based on said performance.

15. The method in claim 14, wherein said discontinuous time slices are greater than a minimum monitoring time interval.

16. The method in claim 14, wherein said reduced duty cycle and said discontinuous time slices are selected to avoid degrading a quality of service measure of said storage system below a level promised to existing clients of said storage system.

17. The method in claim 14, further comprising, before said generating, analyzing said candidate client to determine an input/output workload that said candidate client is expected to generate in order to produce said approximated additional workload from said candidate client, wherein said approximated additional workload approximates a demand said input/output workload would place on said storage system.

18. A program storage device readable by machine, tangibly embodying a program of instructions executable by the machine to perform a method for managing a multi-workload storage system, said method comprising:

analyzing a candidate client to determine an input/output workload that said candidate client is expected to generate to produce an approximated additional workload from said candidate client;

generating a proxy workload from said additional workload, wherein said proxy workload is designed to consume a lower average performance resource of said storage system than said additional workload and has a reduced duty cycle when compared to a duty cycle of said approximate workload;

applying said proxy workload to said storage system during discontinuous time slices;

measuring a performance of said storage system, during said applying of said proxy workload; and estimating an impact of said additional workload on said storage system based on said performance.

19. The program storage device in claim 18, wherein said discontinuous time slices are each greater than a minimum monitoring time interval.

20. The program storage device in claim 18, wherein said reduced duty cycle and said discontinuous time slices are selected to avoid degrading a quality of service measure of said storage system below a level promised to existing clients of said storage system.

21. The program storage device in claim 18, wherein said approximated additional workload approximates a demand said input/output workload would place on said storage system.

* * * * *